Feb. 22, 1938.  N. OBENSHAIN  2,108,992

DEVICE FOR CUTTING FRUIT INTO SECTORS

Filed Aug. 13, 1936

INVENTOR:
Noel Obenshain

Patented Feb. 22, 1938

2,108,992

UNITED STATES PATENT OFFICE 2,108,992

DEVICE FOR CUTTING FRUIT INTO SECTORS

Noel Obenshain, Piedmont, W. Va.

Application August 13, 1936, Serial No. 95,827

1 Claim. (Cl. 146—150)

The device is essentially a receptacle for holding the fruit and having slots thru which the fruit can be cut into the preferred form with a knife or other sharp instrument.

Upon inquiring why lemons, when served with iced-tea and the like, were often cut into rings instead of sectors, since the sectors are much more convenient to use, I found that in cutting the lemons into sectors, there existed a considerable hazard of cutting one's hand. No simple device for this purpose was found on the market and apparently no one questioned had seen or heard of any device for the purpose. So, on July 17, 1936, I designed and constructed of wood the very simple device herein described. It was tried out in a hotel kitchen and declared very useful, not only eliminating the former accident hazard but making it possible to more quickly, neatly and uniformly divide the lemons. Further search in the search room of the Patent Office failed to reveal any device of similar design.

Referring to the attached drawing, Fig. 1 shows the device and the suggested method of using same. The knife 1 is of no special design. Any sharp blade or knife could be used. The lemon or other fruit 2 is placed in the device 3 and the knife 1 forced thru it, guided by the slots 5 in said device. Preferably the fruit is held stationary, the knife removed and cut down thru the other slots until the fruit is cut into the desired number of sectors. It was found that six or eight slots were quite satisfactory. Of course, more or less slots could be provided as desired. The drawing shows eight slots.

Figure 2:
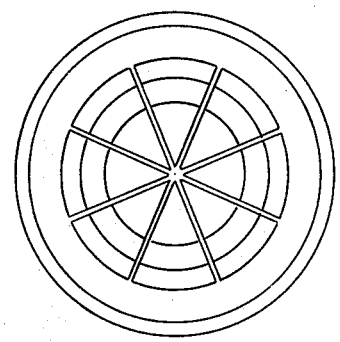
Fig. 2 shows a top view of the device.
Figure 1:
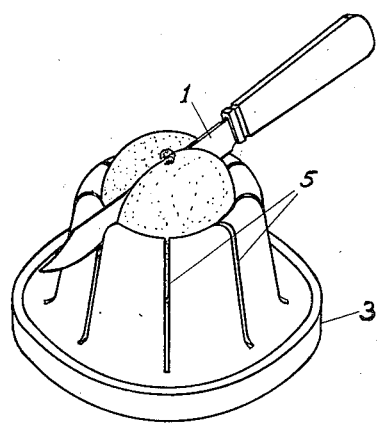
Figure 3:
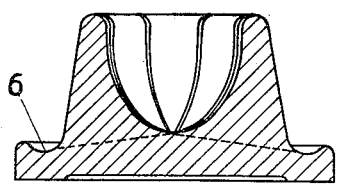
Fig. 3 shows a section view of same as constructed of wood or other material that would not dull the knife used to cut the fruit. The groove 6 in the base serves to catch any juice that might drain out.
Figure 4:
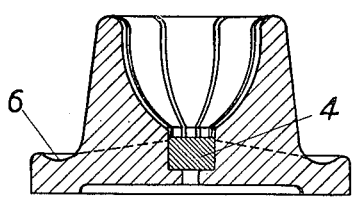

Fig. 4 shows a section view of the device in a preferred form as constructed of glass, porcelain, plastics or other similar materials. The small block 4 is primarily provided to prevent the knife's edge coming in contact with the hard base material and thereby dulling said edge. The block 4 could be made of wood, rubber or other material that would not damage the edge of the knife. Of course, this block 4 could be omitted if desired and the device constructed as shown in Fig. 3.

Figure 5:
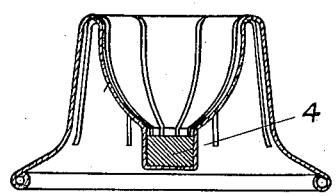

Fig. 5 shows a section view of the device as possibly constructed of stamped metal or similar materials. The block 4 is employed as described in the foregoing paragraph.

While the device was originally designed for cutting lemons, there is no reason why it could not be used for cutting other fruits such as oranges, tomatoes and the like if constructed to the proper dimensions. For this reason I do not wish to limit its use or size only to lemons.

It has been found satisfactory to have the sides of the receptacle extend up approximately two-thirds the height of the fruit but in no way do I limit it to this particular proportion.

Various materials could be used in constructing the device and I do not limit them to those previously mentioned in this specification.

Various modifications in design may be found desirable or necessary in order to adapt the device for manufacture on a production basis, such modifications still being within the scope of my invention.

I claim:

A device for cutting fruit into sectors comprising a circular cup-like receptacle built onto a flange-like base, said receptacle having upstanding walls with an inside depth substantially greater than one-half the inside diameter, the walls of the receptacle having radially arranged vertical slots intersecting at the center of the receptacle, the slots extending from the top to the bottom of said walls and being open at the top to receive a knife, a knife stop of soft material located in the bottom of the receptacle and centrally thereof, said base having a groove in its top surface adjacent to and encircling said receptacle and communicating with said slots.

NOEL OBENSHAIN.